United States Patent [19]
Hafner et al.

[11] Patent Number: 5,629,255
[45] Date of Patent: May 13, 1997

[54] HIGHLY ACTIVE CATALYSTS FOR OLEFIN POLYMERIZATION AND A POLYMERIZATION PROCESS USING THESE CATALYSTS

[75] Inventors: Norbert Hafner, Linz; Wilfried Töltsch, Marchtrenk; Hans Ledwinka, St. Ulrich; Wolfgang Neissl, Lichtenberg, all of Austria

[73] Assignee: PCD Polymere Gesellschaft m.b.H., Schwechat-Mannswörth, Austria

[21] Appl. No.: 531,382

[22] Filed: Sep. 21, 1995

Related U.S. Application Data

[63] Continuation-in-part of Ser. No. 246,078, May 19, 1994, abandoned.

[30] Foreign Application Priority Data

May 21, 1993 [AU] Australia .................................. 993/93

[51] Int. Cl.⁶ ........................................................ C08F 4/64
[52] U.S. Cl. ........................ 502/120; 502/117; 502/152; 526/160
[58] Field of Search ...................... 502/117, 152, 502/120; 526/160

[56] References Cited

U.S. PATENT DOCUMENTS

| | | |
|---|---|---|
| 3,932,307 | 1/1976 | Setterquist . |
| 3,950,269 | 4/1976 | Setterquist . |
| 3,971,767 | 7/1976 | Setterquist . |
| 4,228,263 | 10/1980 | Howard, Jr. et al. . |

FOREIGN PATENT DOCUMENTS

| | | |
|---|---|---|
| 2124419 | 9/1972 | France . |
| 267986 | 5/1989 | German Dem. Rep. . |
| 2040353 | 2/1971 | Germany . |
| 2415440 | 10/1974 | Germany . |
| 2522331 | 5/1975 | Germany . |
| 2501239 | 7/1975 | Germany . |
| 2508622 | 11/1975 | Germany . |
| 2510616 | 11/1975 | Germany . |
| 578008 | 10/1977 | U.S.S.R. . |
| 704943 | 12/1979 | U.S.S.R. . |

OTHER PUBLICATIONS

Chemical Abstracts 98:107860f (1983).

Derwent CPI: Ref. 08660V/05, 1974.

Derwent CPI: Ref. 08661V/05, 1974.

Hochmolekularbericht, H.13168/79, 1979.

*Primary Examiner*—David W. Wu
*Attorney, Agent, or Firm*—Wenderoth, Lind & Ponack

[57] ABSTRACT

Highly active catalysts, for olefin polymerization, from tetraneophylzirconium and partly hydroxylated metal oxides from group IIa, IIIa, IVa or IVb of the Periodic Table, which are essentially free from by-products.

5 Claims, No Drawings

HIGHLY ACTIVE CATALYSTS FOR OLEFIN POLYMERIZATION AND A POLYMERIZATION PROCESS USING THESE CATALYSTS

This is a continuation-in-part of Ser. No. 08/246,078, filed May 19, 1994, now abandoned.

The invention relates to highly active catalysts for olefin polymerization and to a polymerization process using these catalysts.

Catalysts for homo- and copolymerization of olefins, such as, for example, ethylene, propylene, 1-butene and higher 1-olefins, which are obtained by reaction of organometallic Ti, Zr or Hf compounds with partly hydroxylated surfaces of metal oxides, for example of $Al_2O_3$, $TiO_2$, $SiO_2$ or MgO, are described in U.S. Pat. Nos. 3,932,307, 3,950, 269, 4,228,263 and 4,335,225. The polyolefins obtained with these catalysts are distinguished by improved properties, and in particular polyolefins having elastomeric properties can be obtained above all because of a stereoregular block arrangement in the chain structure. For example, elastomeric polypropylenes such as are described, for example, in U.S. Pat. No. 4,335,225, essentially comprise blocks of isotactic and atactic propylene sequences arranged in alternation in the polymer chain, it also being possible for additional comonomers to be incorporated in the polymer chain. Elastomeric polyolefins are distinguished above all by a high elasticity and good toughness and impact strength properties. The elastomeric polyolefins are prepared by conventional processes by polymerization of the olefins, if appropriate together with further comonomers, in organic reaction media, such as, for example, hexane or cyclohexane or in the liquid or gaseous monomer.

The disadvantage of the known catalysts used for the preparation of elastomeric polyolefins lies above all in the fact that their activity is not very high, so that relatively large amounts of catalyst are needed for the polymerization. According to U.S. Pat. No. 4,228,263, for example, the polymer yield of the catalysts is 30,000 to 1 million g of polymer per g atom of Zr, but the yield of 575,000 g of polymer per g atom of Zr actually achieved according to the examples is far below these values. In addition to the high catalyst consumption, it also proves to be very unfavorable that at the same time relatively large amounts of catalyst residues are also present in the finished polymer, representing contamination of the polymer, with which a deterioration in the polymer properties, in particular, the mechanical and optical properties, is associated. According to the preferred procedure of U.S. Pat. No. 4,228,263, for example, the catalyst residues in the polymer in Example 3A are 0.63% by weight of $Al_2O_3$ and 217 ppm of Zr.

There was accordingly the object of eliminating these disadvantages, and in particular of discovering catalysts having a higher activity, with which higher polymer yields can be achieved. Such improved catalysts are obtained, according to the invention, by a procedure in which the concomitant products or by-products likewise formed during preparation of the catalyst are partly or completely removed from the catalyst.

The invention accordingly relates to a highly active catalyst comprising the reaction product of:

a) tetraneophylzirconium with b) metal oxides selected from the group consisting of IIa, IIIA, IVa, IVb metal oxides having a partly hydroxylated surface, or mixtures thereof, in a hydrocarbon as the reaction medium, the resulting catalyst optionally being hydrogenated, wherein the resulting catalyst contains the by-products formed during the reaction in an amount not exceeding 1.1% by weight.

Possible metal oxide components (catalyst supports or catalyst carriers) of the catalyst are, in particular, those which are described in U.S. Pat. Nos. 3,932,307 and 3,950, 269. Preferred metal oxides are $Al_2O_3$, $TiO_2$, $SiO_2$ or MgO. The hydroxylation of the metal oxide surfaces is carried out here, for example, in a water vapor atmosphere and by subsequent drying at 300° to 500° C., preferably in vacuo.

The two catalyst components are in general reacted in a ratio of about 0.01 to 1 mmol of the organometallic compound per gram of metal oxide. Catalysts which are prepared by reaction of tetraneophylzirconium (TNZ) with hydroxylated $Al_2O_3$ are preferred. The preferred ratio of TNZ to $Al_2O_3$ is about 0.1 to 1 mmol of organozirconium compound per gram of $Al_2O_3$. The preparation of the catalysts in their known form of low activity is likewise described, for example, in U.S. Pat. Nos. 3,932,307 and 4,335,225, and their preparation in their hydrogenated form is described in U.S. Pat. Nos. 3,950,269 and 3,971,767.

The invention furthermore relates to a process for the preparation of highly active catalysts for olefin polymerization, in which a) tetraneophylzirconium is reacted with b) metal oxides from group IIa, IIIA, IVa or IVb having a having a partly hydroxylated surface or mixtures thereof, in a hydrocarbon as the reaction medium, the resulting catalysts optionally being hydrogenated, wherein the by-products formed during the reaction are removed from the catalyst, preferably to such an extent that the resulting catalyst contains the by-products in an amount not exceeding 1.1% by weight, especially preferred not exceeding 0.3% by weight.

The hydrocarbons customary in olefin polymerization, such as, for example, alkanes, for example butane, pentane or hexane; cycloalkanes, for example cyclohexane; or mineral oils, are used as the reaction medium.

It is assumed that the reaction of the organometallic TNZ-compound with the partly hydroxylated metal oxide, for example, partly hydroxylated $Al_2O_3$, preferentially takes place in accordance with the following equation:

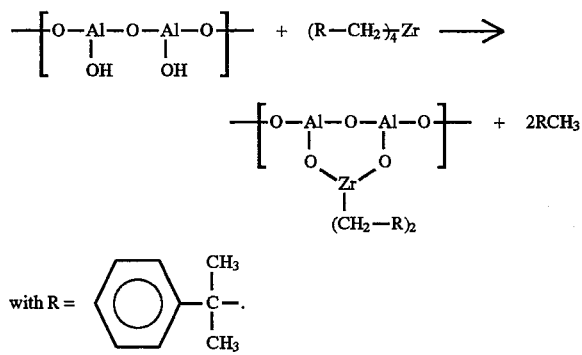

The removal, according to the invention, of the by-products which takes place after the reaction to give the Al- and Zr-containing catalyst is carried out, for example, by washing out, for example with a liquid inert hydrocarbon such as is employed as the reaction medium, by mechanical separation processes, such as, for example, by filtration, centrifugation or decantation together with the reaction medium, followed by evaporation, preferably in vacuo, or only by evaporation, preferably in vacuo.

In the purification according to the invention which follows the reaction, the $RCH_3$ (tert-butylbenzene) formed as a by-product in accordance with the above equation, in addition to the catalyst, is preferably removed. Other possible by-products are, for example, also products which are formed during aging or hydrogenation of the catalyst and are usually obtained in a liquid or dissolved form, for example R—CH$_2$* radicals or the compounds formed during any hydrogenation, such as ethylcyclohexane, (1-methylethyl) cyclohexane and (1,1-dimethylethyl)cyclohexane. In comparison with the activities of the known catalysts, great improvements are found if the by-products, especially tert-butylbenzene (TBB), are removed according to the invention, together with the liquid hydrocarbon employed as the reaction medium. It furthermore proves to be advantageous to recrystallize the TNZ employed for preparation of the catalyst from a liquid hydrocarbon before the reaction with the metal oxide, and in this case preferably to dissolve it at the lowest possible temperature.

The invention furthermore relates to a process for the polymerization of olefins using the catalysts according to the invention, in which particularly high polymer yields, based on the amount of catalysts employed, are achieved. Possible olefins are above all ethylene, propylene, 1-butene, 1-pentene, 4-methyl-1-pentene, 1-hexene, 1-heptene, 1-octene, 1-nonene, 1-decene, hexa-1,4-diene or hexa-1,5-diene, it being possible for both homopolymers and copolymers to be prepared. The catalysts are preferably used for homo- or copolymerization of ethylene, propylene, 1-butene, 1-pentene and 4-methyl-1-pentene, particularly preferably propylene, if appropriate with ethylene as a comonomer. The polymer yields in the case of propylene are about 7×10$^6$ g per mole of Zr employed. The catalysts can be introduced into the polymerization mixture either as a powder or as a suspension in a hydrocarbon, for example butane, pentane, hexane, cyclohexane or mineral oils.

It is possible to control the molecular weights of the polymers within wide limits with the aid of the catalysts according to the invention by addition of hydrogen during the polymerization. The catalysts can be employed in all the known polymerization processes, such as, for example, in continuous and discontinuous solution, bulk or gas phase processes. They have an increased stability, even at higher polymerization temperatures, whereby they display an increased efficiency and can also be employed in processes having a relatively long residence time.

PREPARATION OF CATALYSTS A TO I

EXAMPLE 1

Catalyst A 44.22 g of a tetraneophylzirconium gray-brown in color (TNZ; Tm=66° C., DuPont) were dissolved under an extra pure nitrogen atmosphere, at 20° C. in an inert gas flask, in 620 ml of n-hexane purified by means of a Cu catalyst (BASF catalyst R3-11 at 70° C.) to remove oxygen and 4A and 10A molecular sieves to remove water and polar impurities. After the majority of the insoluble residue had settled, the resulting suspension was filtered after 15 minutes through a glass frit into a stirred inert gas glass flask (heated thoroughly at above 150° C. and flushed with extra pure nitrogen (less than 2 ppm of O$_2$)) cooled to −40° C. After conclusion of the filtration (duration about 140 minutes), the flask was kept at −40° C. for a further 15 minutes, while stirring, in order to precipitate the TNZ as quantitatively as possible. After the TNZ had settled, the supernatant solution was filtered by means of a filter candle under an increased N$_2$ pressure into another cooled inert gas flask. The TNZ which remained was dissolved in a further 350 ml of n-hexane at about 5°–10° C. in the course of 15 minutes and, after cooling to −34° C., was precipitated again.

After the TNZ precipitate had settled, the solution was filtered again by means of an increased N$_2$ pressure through a glass filter candle into the cooled inert gas flask with the first mother liquor. The TNZ was then dried by application of an oil pump vacuum (below 1×10$^{-2}$ mbar) via cold traps connected in series and cooled with liquid nitrogen. The purified TNZ had a melting point of 68° C. and was white to cream-colored. The collected mother liquors were concentrated to about 200 ml and the TNZ still dissolved was precipitated by cooling to −40° C. After renewed pressure filtration through a filter candle, the TNZ was dissolved again in 100 ml of hexane, precipitated again at −40° C., filtered off and dried by means of a vacuum as above. The total yield of this purification process was 82.2%. All the operations were carried out under extra pure nitrogen.

266.7 g of conditioned Al$_2$O$_3$ (Alumina C from DEGUSSA, conditioned at about 800°–1000° C. in a stream of N$_2$ and after storage at a relative humidity of 50% and 23° C. for 16 hours and renewed drying to establish an optimum hydroxyl concentration on the surface of about 1 mmol/g of Alumina C at 400° C. in a stream of nitrogen) were weighed into a 6 l 4-necked inert gas flask, and 5035 ml of n-hexane, purified by means of BASF catalyst R 3-11 and 4A and 10A molecular sieves, were added. The suspension was stirred at 300 revolutions/minute for about 1 hour. The 33.23 g of TNZ prepared above (without the product from the worked-up mother liquor) were then dissolved in 465 ml of n-hexane (purified as above) at 20° C. and this TNZ solution was next added dropwise, with continuous stirring, to the Al$_2$O$_3$ suspension in the course of 50 minutes, a significant reduction in the viscosity of the suspension occurring after addition of a few ml of TNZ solution. After addition of the TNZ solution, the speed of rotation was reduced to about 120 revolutions/minute and the mixture was stirred for a further 12.5 hours under protection from light. To accelerate the filtration, the resulting catalyst solid was allowed to settle for 1 hour and the solution was finally removed by means of pressure filtration through a glass frit (duration 3 hours). The catalyst solid was then dried to a constant weight of 292 g by application of a vacuum of less than 1.10$^{-2}$ mbar (oil diffusion pump with two cold traps connected in series and cooled with liquid nitrogen), while stirring (duration about 5 hours). All the operations were carried out under extra pure nitrogen. The resulting TNZ/Al$_2$O$_3$ catalyst had a beige to pale brown coloration and was a free-flowing powder which had a tendency to form small beads of about 1 mm diameter. The Zr content was 1.66% by weight.

EXAMPLE 2

Catalyst B

The preparation of the catalyst was carried out analogously to Example 1, but in accordance with the parameters listed in Table 1, with the exception that the tetraneophylzirconium (TNZ) was recrystallized from n-hexane a second time (melting point 68.2° C., Zr content 1.69% by weight).

EXAMPLES 3–6

Catalyst C–F

The preparation of the catalysts was carried out analogously to Example 1, but in accordance with the parameters listed in Table 1.

EXAMPLE V7

Comparison catalyst G

The preparation of the catalyst was carried out analogously to Example 2 in accordance with the parameters from Table 1, but without removal of the reaction medium.

EXAMPLE 8

Catalyst H 30.79 g of the catalyst obtained according to Example 2 were charged with 1.2 bar absolute of hydrogen in a 250 ml 3-necked inert gas flask with a thermometer and manometer and stirred at 100 revolutions/minute at 30° C. for 105 minutes. After the pressure had dropped to 0.2 bar absolute, hydrogen was injected again to 1.2 bar absolute and the flask was heated at 47° C. in an air bath. After 3 hours, the pressure in the inert gas flask had dropped to 0.6 bar absolute. The inert gas flask was evacuated by means of an oil vacuum pump via two cold traps cooled with liquid nitrogen to remove reaction products (below $1\times10^{-2}$ mbar). During this operation, 0.57 g of a mixture of chiefly alkylcyclohexanes was removed.

The resulting partly hydrogenated $TNZ/Al_2O_3$ catalyst was in the form of a free-flowing beige to pale brown powder having a Zr content of 1.72% by weight.

EXAMPLE 9

Catalyst I 11.2 g of the catalyst prepared according to Example 8 were charged with 1.2 bar absolute of hydrogen in a 250 ml 3-necked inert gas flask with a thermometer and manometer. The flask was heated for 94 minutes in a water bath heated at 80° C., the catalyst being stirred at 100 revolutions/minute. The gas temperature inside rose to 44° C. during this operation, and the pressure dropped to 1.08 bar absolute. The flask was then cooled to room temperature and evacuated as in Example 8. The decrease in weight during the hydrogenation (94 minutes) was less than 0.1 g. The resulting $TNZ/Al_2O_3$ catalyst was hydrogenated to the extent of more than 90%.

B. POLYMERIZATIONS USING CATALYSTS A TO I

EXAMPLE 10

After three propene/vacuum flushing cycles, a 20 l double-walled reactor which had been heated thoroughly at 160° C. under 0.1 bar and had a surface-polished wall-sweeping stirrer, a thermostat jacket and thermometer, speed of rotation and torque measurement, was charged with 7.15 kg of propene at 25° C. After the stirrer had been raised to 400 revolutions/minute, 11.24 g of catalyst A prepared according to Example 1 were flushed in with 300 ml of liquid propene (about 20° C.) and the speed of rotation was reduced to 260 revolutions/minute after 2 minutes. The propene temperature was then increased to 60° C. in the course of about 10 minutes and this temperature was maintained for 67 minutes from addition of the catalyst. The speed of rotation of the stirrer was then lowered to 200 revolutions/minute and 4000 g of acetone, preheated to about 40°–50° C., were introduced into the reactor in the course of 3 minutes by means of an increased nitrogen pressure. After the speed of rotation of the stirrer had been increased to 400 revolutions/minute for about 2 minutes and then lowered to 100 revolutions/minute, the propene which had not been consumed was flashed off in the course of 20 minutes. The ELPP (elastomeric polypropylene)-acetone slurry which remained was stirrable and could be discharged via the 1 inch bottom outlet of the reactor. To stabilize the ELPP, an appropriate amount of stabilizer mixture of IONOL® (Shell) and IRGAFOS®, PEPQ (Ciba-Geigy) in the weight ratio of 2:1, which corresponded to about 0.3% by weight in the dried polymer, was added to the acetone slurry.

The reactor wall and stirrer were largely free from polymer. After filtration of the ELPP and drying in a stream of nitrogen at 50° C., 1.39 kg of a powdery/crumbly, non-tacky ELPP having a melting point (Tm) of 147.1° C. (measured with a DuPont 910/20 differential scanning calorimeter (Thermal Analyst 2100)) were obtained, corresponding to a balanced Zr content of 135 ppm and an $Al_2O_3$ content of 0.74% by weight.

EXAMPLE 11

The procedure was analogous to Example 10 in accordance with the parameters shown in Table 2, with the difference that 8.25 l of $H_2$ were additionally metered in during charging of the reactor with 6.6 kg of propene at 29° C.

The resulting ELPP-acetone slurry was stirrable and could be discharged via the bottom outlet of the reactor. After filtration and vacuum drying, 1.07 kg of a free-flowing ELPP powder having an intrinsic viscosity of 5.42 dl/g, measured in accordance with DIN ISO 1628 at a concentration of 1 g/l, and a melting point of 149.1 ° C., measured with a DuPont 910/20 differential scanning calorimeter (Thermal Analyst 2100), were obtained.

EXAMPLE 12

The procedure followed was analogous to Example 10 in accordance with the parameters given in Table 2, with the difference that the polymerization time was 120 instead of 67 minutes.

The resulting ELPP-acetone slurry was stirrable and could be discharged via the bottom outlet of the reactor. After filtration and vacuum drying, 1.88 kg of a free-flowing ELPP powder having a melting point of 148.1° C., measured with a DuPont 910/20 differential scanning calorimeter (Thermal Analyst 2100), were obtained. The balanced zirconium content was 89 ppm and the $Al_2O_3$ content was 0.49%.

EXAMPLE 13

After carrying out the polymerization for 120 minutes analogously to Example 11 and the polymerization parameters listed in Table 2, 1700 g of methanol, instead of acetone, preheated to about 40°–50° C., were metered into the reactor under a nitrogen prepressure of 40 bar at a speed of rotation of the stirrer of 200 revolutions/minute in the course of 2 minutes. The reactor jacket was then thermostatically controlled at 60° C. and the propylene which had not been consumed was flashed off in the course of 15 minutes. The methanol slurry which remained was stirrable and could be discharged via the 1 inch ball valve at the reactor base. The reactor wall, the stirrer and the thermocouple sheaths were largely free from polymer. After a stabilizer mixture of Ionol® (Shell) and Irgafos® PEPQ (Ciba-Geigy) in a weight ratio of 2:1 had been added to the slurry in an amount corresponding to about 0.3% by weight (based on the dried polymer) and the slurry had been dried in a stream of air and then in vacuo at 50° C., 1.93 kg of a powdery/crumbly, non-tacky ELPP suitable for metering into processing machines and having an intrinsic viscosity of 10.1 dl/g, measured in accordance with DIN ISO 1628 at a concentration of 1 g/l, and a melting point of 147° C., measured with a DuPont 910/20 differential scanning calorimeter (Thermal Analyst 2100), were obtained.

EXAMPLES 14 AND 15

The procedure followed was analogous to Example 12 in accordance with the parameters given in Table 2, with the difference that the polymerization time was increased. The balanced zirconium and $Al_2O_3$ contents show that the catalyst activity was also retained for more than 4 hours at a polymerization temperature of 60° C.

EXAMPLE 16

The procedure followed was analogous to Example 10 in accordance with the parameters given in Table 2, with the difference that the polymerization temperature was increased to 70° C.

The resulting acetone slurry was free-flowing and could be discharged via the bottom valve of the reactor. After the slurry had been stabilized with 0.3% by weight of Ionol/ Irgafos PEPQ (w/w=2:1), based on the polymer, and dried in a stream of air and in vacuo at 50° C., a conveyable and meterable, crumbly/powdery elastomeric polypropylene was obtained. The balanced Zr content and $Al_2O_3$ content of 111 ppm and 0.61% by weight, respectively, corresponds to an increase in activity of about 34% with an increase in the polymerization temperature from 60° to 70° C.

EXAMPLE 17

The procedure followed was analogous to Example 13 in accordance with the parameters given in Table 2, with the difference that the polymerization temperature was 70° C. and 2800 g of acetone were metered in instead of methanol. The crumbly/powdery elastomeric polypropylene obtained after removal of the acetone with a balanced Zr content and $Al_2O_3$ content of 69 ppm and 0.38% by weight, respectively, had an intrinsic viscosity of 10.35 dl/g, measured in accordance with DIN ISO 1628 at a concentration of 1 g/l, and an intrinsic viscosity of 10.22 dl/g, measured in accordance with DIN ISO 1628 at a concentration of 0.55 g/l.

EXAMPLE 18

The procedure followed was analogous to Example 17 in accordance with the parameters given in Table 2, a catalyst B according to Example 2 (TNZ recrystallized twice) being employed and the polymerization time being 4 hours. The ELPP slurry obtained after precipitation with acetone was free-flowing and could be discharged via the bottom valve. After addition of 0.3% of stabilizer, based on the ELPP (Ionol/Irgafos PEPQ (w/w=2:1)) and drying in a stream of air and then in vacuo at 50° C., a crumbly/powdery, elastomeric polypropylene having a balanced Zr content and $Al_2O_3$ content of 41 ppm and 0.22% by weight, respectively, and an intrinsic viscosity of 9.6 dl/g, measured in accordance with DIN ISO 1628 at a concentration of 1 g/l, was obtained.

COMPARISON EXAMPLE V19

The procedure followed was analogous to Example 18 in accordance with the parameters given in Table 2, with the difference that catalyst G according to Example V7, which was prepared in the reaction medium n-hexane and is not according to the invention, was employed without removal of the reaction medium and other reaction products. The ELPP slurry obtained after precipitation with acetone was free-flowing and could be discharged through the bottom valve. After addition of about 0.3% by weight of stabilizer mixture of Ionol/Irgafos PEPQ (w/w=2:1), based on the dry polymer, and drying in a stream of air and then in vacuo at 50° C., a crumbly/powdery elastomeric polypropylene having a balanced Zr content and $Al_2O_3$ content of 60 ppm and 0.33%, respectively, and an intrinsic viscosity of 9.8 dl/g, measured in accordance with DIN ISO 1628 at a concentration of 1 g/l, was obtained. It can be seen from the example that far greater catalyst residues remain in the polymer when the catalyst which is not according to the invention is used.

EXAMPLE 20

The procedure followed was analogous to Example 17 in accordance with the parameters given in Table 2, with the difference that the polymerization temperature was 80° C.

The elastomeric polypropylene obtained after removal of the acetone had a balanced Zr content and $Al_2O_3$ content of 54 ppm and 0.30% by weight, respectively, corresponding to an increase in activity of 28% with an increase in the polymerization temperature from 70° to 80° C.

EXAMPLE 21

The procedure followed was analogous to Example 17 in accordance with the parameters given in Table 2, with the difference that the polymerization temperature was 80° C. and the polymerization time was 4 hours. The ELPP obtained after removal of the acetone had a balanced Zr content and $Al_{23}$ content of 35 ppm and 0.19% by weight, respectively.

EXAMPLE 22

The procedure followed was analogous to Example 12 in accordance with the parameters given in Table 2, with the difference that after a polymerization time of 15 minutes, after metering in the catalyst, the overall pressure in the reactor of 22.7 bar was increased to 23.7 bar by metering in ethylene and was kept at this pressure by metering in ethylene until the precipitation with acetone after 60 minutes. The total amount of ethylene metered in was about 270 g.

The resulting acetone slurry of the elastomeric copolymer was stirrable and free-flowing and could be discharged via the bottom valve. The Zr content and $Al_2O_3$ content of the elastomeric copolymer, which had been dried in a stream of air and then in vacuo at 50° C. was 58 ppm and 0.33 by weight, respectively.

EXAMPLE 23

The procedure followed was analogous to Example 12 in accordance with the parameters given in Table 2, with the difference that ethylene was metered in at a constant gas flow rate from a polymerization time of 15 minutes, after metering in the catalyst, until the precipitation with acetone. The amount of ethylene metered in was about 610 g.

The resulting acetone slurry of the elastomeric copolymer was stirrable and free-flowing and could be discharged via the bottom valve of the reactor. The Zr content and $Al_2O_3$ content of the elastomeric copolymer, which had been dried in a stream of air and then in vacuo at 50° C. was 42 ppm and 0.23% by weight, respectively.

EXAMPLE 24

The procedure followed was analogous to Example 12 in accordance with the parameters given in Table 2, with the difference that hydrogenated catalyst H prepared according to Example 8 was employed.

The resulting acetone slurry of the elastomeric polypropylene was stirrable and free-flowing and could be discharged via the bottom valve. The Zr content and $Al_2O_3$ content of the finely powdered, conveyable elastomeric polypropylene, which had been dried in a stream of air and then in vacuo at 50° C. was 89 ppm and 0.49% by weight, respectively.

EXAMPLE 25

The procedure followed was analogous to Example 18 in accordance with the parameters given in Table 2, with the difference that hydrogenated catalyst I prepared according to Example 9 was employed.

The resulting acetone slurry of the elastomeric polypropylene was stirrable and free-flowing and could be discharged via the bottom valve. The balanced Zr content and $Al_2O_3$ content of the finely powdered and conveyable elastomeric polypropylene, which had been dried in a stream of air and then in vacuo at 50° C., was 50 ppm and 0.27% by weight, respectively.

C. PREPARATION OF CATALYSTS J to M

EXAMPLE 26

Catalyst J 26.1 TNZ-Purification

Analogous to Catalyst A (Example 1).

26.2 Preparation of the Catalyst-support

For the manufacture of catalyst carrier, a cylindrical pipe-shaped container with a length to diameter ratio equal to 5 was used. One side of this pipe ends conically with a Teflon-sealed 1-inch ball valve and additional Teflon-sealed screw closure. Two further gas inlet and outlet conduits (one with a metal filter PD=20 µm) are provided on the conical pipe end for creating a vacuum and $N_2$ supply and can be closed by means of WHITEY cocks. The other end of the pipe likewise has a 1-inch opening which can be sealed by a screw closure and a gas supply which can be sealed by a WHITEY cock. The pipe has a volume of about 15 l and the pressure loss of the pipe at 425° C. when filling with 5 bar $H_2$ amounted to less than 0.05 bar over 14 hours. The pipe can be heated over the entire pipe volume by means of an electric heating mantle with a temperature deviation of <±10° C. Aluminum oxide C (1100 g) from the DEGUSSA Company was filled in the pipe with the help of a vacuum. Within 1.5 hours, the aluminum oxide C was heated to 425° C., whereby the pipe was evacuated continually by means of a two-stage slide vane rotary vacuum pump coupled over two liquid nitrogen cooled condensation traps. This conditioning temperature was maintained over 27 hours, whereby a terminal vacuum of 0.6 mbar was achieved. During this 27 hour conditioning process, the pipe was impressed with pure nitrogen (<1 ppm $H_2O$, $O_2$) to 4 bar abs. three times for the complete removal of $H_2O$ and $O_2$ and then evacuated again. The pipe was impressed with pure nitrogen to 4 bar abs. and allowed to cool 28.5 hours after the start of the heating process. After achieving an internal temperature of 200° C., the pipe was again impressed with pure nitrogen to 4 bar abs. and then allowed to cool to room temperature.

The measurement of the OH concentration of the resulting conditioned $Al_2O_3$ yielded 0.64 mmol/g. The $O_2$ concentration in the conditioning container was smaller than 1 ppm.

26.3 Manufacture of the Neophylzirconium Aluminate Catalyst

In a 4 l protective gas flask, 98.8 g of conditioned $Al_2O_3$ was weighed in and mixed with 1877 ml hexane, purified with BASF catalyst R3-11 and 4 or 10A molecular sieve. The $Al_2O_3$ was suspended by stirring at about 300 rpm for one hour. Then 12.35 g TNZ (flash point 68° C.) was dissolved at 20° C. in 148 ml hexane (purified as above) added in drops within 55 min., whereby after adding a few ml of solution, a clear reduction in the viscosity of the suspension occurs. After adding the TNZ solution, the rotational speed was reduced to 120 rpm and agitated for another 16 hours under protection against light. Then the agitation of the sedimentation of the catalyst solid material was stopped. Over a glass frit, 1129 ml of the hexane solution was drawn off by creating an $N_2$ excess pressure in the protective gas flask. The analysis of this solution for tert-butylbenzene yielded 3262 mg/l. Subsequently, the catalyst solid material was dried at room temperature by a three-hour application of a vacuum by means of a two-stage oil-sealed slide vane rotary vacuum pump (LEYBOLD-HERÄUS, TRIVAC D8B) coupled over two interconnected, liquid nitrogen cooled condensation traps (terminal vacuum $<4\times10^{-1}$ mbar). The analysis of the solution (800 ml) condensed in the condensation traps for tert-butylbenzene yielded 1826 mg/l. The balance of the catalyst solid material yielded 104.4 g. Into 150 ml hexane (purified as above), 30 g of this catalyst solid material was suspended and agitated for 2 hours. The gas chromatographic analysis of the solution sample (9 ml) for tert-butylbenzene, drawn off through the application of an $N_2$ excess pressure by means of a glass frit yielded 2123 mg/l, which corresponds to a tert-butylbenzene content of 10600 ppm in the catalyst (1.06% wt.).

EXAMPLE 27

Catalyst K

The catalyst J suspended in 150 ml hexane in accordance with Example 26 was vacuum dried as above again for 2 hours after taking the sample for testing for tert-butylbenzene. The analysis of the 130 ml solution in the condensation traps yielded 719 mg/l tert-butylbenzene. In 380 ml hexane, 20 g of this dried catalyst was suspended again, agitated for 2 hours and 170 ml of the solution was drawn off with a glass frit (tert-butyl content of the solution 405 mg/l). Then another 200 ml of solution was drawn off by applying a vacuum (terminal vacuum $9\times10^{-2}$ mbar) as above, which has a content of 415 mg/l tert-butylbenzene. The calculated remaining content of tert-butylbenzene in the catalyst amounted to about 2700 ppm (0.27% wt.).

EXAMPLE 28

Catalyst L 28.1 TNZ Purification and Catalyst Carrier Manufacturing Analogous to Example 26

28.2 Manufacture of the Neophylzirconium Aluminate Catalyst

In a 2 l protective gas flask, 50.1 g of the conditioned $Al_2O_3$ was weighed in an mixed with 1000 ml hexane, purified by means of BASF Catalyst R3-11 and 4 or 10A molecular sieve. The $Al_2O_3$ was suspended by agitation at about 300 rpm for one hour. Then 6.25 TNZ (flash point 68° C.) was dissolved at 20° C. in 75 ml hexane (purified as above), added by drops within 30 min., whereby after adding a few ml of solution, a clear reduction in viscosity of the suspension occurs. After adding the TNZ solution, the rotational speed was reduced to 120 rpm and agitated another 16 hours under protection against light. Then the agitation for the sedimentation of the catalyst solid material was stopped. Over a glass frit, 510 ml of the hexane solution was drawn off by creating an $N_2$ excess pressure in the protective gas flask. The analysis of this solution for tert-butylbenzene yielded 2720 mg/l. Subsequently, the tert-butylbenzene resulting from the formation reaction was removed as much as possible by concentrating the remaining catalyst slurries by means of a vacuum (50 ml) and the addition—four times—of hexane (500, 750, 500, 1000 ml), drawing off a partial amount of the solution of the resulting catalyst slurry in each case by means of glass frits (270, 470, 240, 440 ml) and an additional partial amount by applying a vacuum (200, 275, 275, 740 ml). (Difference in the amount of tert-butylbenzene found in the formulation solution and the amounts found in the solution drawn off yields—14 ppm.) In 20 ml hexane, 1.6 g of the catalyst dried in the vacuum (terminal vacuum 9×10$^{-2}$ mbar) was suspended and a sample of the hexane solution was drawn after 20 min. of agitation. The tert-butylbenzene amounted to 207 mg/l, which corresponds to a content of 2600 ppm in the catalyst.

EXAMPLE 29

Catalyst M 29.1 TNZ Purification Analogous to Example 26

29.2 Manufacture of Catalyst Carriers

For the manufacture of catalyst carrier, a cylindrical pipe with a length to diameter ratio equal to 5 was used. Both sides of this pipe end conically, whereby on one side a metal filter plate in the interior which is fitted to the diameter of the pipe serves as a gas-permeable floor plate. The conical end on the floor side is connected over a WHITEY 10 mm three-way valve to a vacuum system and a pure nitrogen supply conduit. The container pressure can be measured over a manometer connected to this conical part. The conical end on the head side is sealed with a Teflon-sealed screw closure. On an additional 16 mm pipe conduit with a metal filter on the upper cone, a vacuum system and a pure nitrogen supply conduit are connected by means of a WHITEY 10 mm three-way cock. The vacuum system can also be sealed over two very fine vacuum cocks (leakage rate <10$^{-9}$ mbar×1×s$^{-1}$), and the N$_2$ supply conduit is sealable over a second WHITEY cock to the container. Another 16 mm opening on the upper cone that can be sealed by means of a metal conical screw serves as a view opening when filling the container. Over an additional 8 mm connection to the upper pipe, another pressure/vacuum measurement can be realized. On the longitudinal side of the pipe, shiftable thermoelements are inserted in the interior which conduct a measurement of the temperature distribution in the container interior. The pipe can be heated over the entire volume of the pipe by means of an electric heating mantle with a temperature deviation of <±10° C.

The pipe has a volume of about 24 l and the pressure loss of the pipe at 425° C. when filling with 5 bar H$_2$ is smaller than 0.05 bar over 14 hours. The connected vacuum system allows the maintenance of a vacuum in an unfilled pipe of 6×10$^{-3}$ mbar at 450° C.

About 1900 g aluminum oxide C from the DEGUSSA Company was filled in to the conditioning containers with the help of the vacuum. Then the container was evacuated over the vacuum system connected on the head side (head side 0.6 mbar), impressed with pure nitrogen to 4 bar abs. and evacuated again (0.5 mbar). After impressing with pure nitrogen again to 1.6 bar abs., the container was heated up to an internal temperature of 450° C. within about 2 hours, whereby after about 1.25 hours, it was already evacuated again. After achieving a vacuum of 0.1 mbar, the vacuum system on the floor side was switched on and after 2 hours impressed with pure nitrogen to 4 bar abs. three times and then evacuated in each case to 0.25 mbar. After impressing again with pure nitrogen to 4 bar, cooling to room temperature took place 28 hours after the beginning of the heating. The measurement of the OH concentration on Al$_2$O$_3$ yielded 0.93 mmol/g.

For the further reduction of the OH concentration, the conditioning was continued under evacuation and renewed heating to 455° C. within 1.25 hours. After 21.5 hours, the vacuum amounted to 0.09 mbar at an average temperature of 456° C. Then the container was again impressed with pure nitrogen three times to 4 bar abs. and suctioned to 1.2 bar abs. in each case. After renewed impression to 4 bar abs., the heating was switched off 23 hours after the beginning of the heating and the container was cooled to room temperature. The measurement of the OH concentration of the Al$_2$O$_3$ yielded 0.71 mmol/g.

29.3 Manufacture of the Neophylzirconium Aluminate Catalyst

In a 2 l protective gas flask, 30.6 g Al$_2$O$_3$, conditioned as above, was weighed in an mixed with 715 ml hexane, purified with BASF catalyst R3-11 and 4 or 10A molecular sieve. The Al$_2$O$_3$ was suspended by agitation at about 300 rpm for 0.75 hour. Then 3.83 g TNZ (flash point 68° C.) was dissolved in 77 ml hexane (purified as above), the solution was filtered and added in drops within 30 min., whereby after adding a few ml of solution, a clear reduction in the viscosity of the suspension occurs.

After adding the TNZ solution, the rotational speed was reduced to 120 rpm and agitated for another 13 hours under protection against light. Then the agitation for the sedimentation of the catalyst solid material was stopped. Over a glass frit, 390 ml of the hexane solution was drawn off by creating an N$_2$ excess pressure in the protective gas flask. The analysis of this solution for tert-butylbenzene yielded 2720 mg/l. Then the formulation solution was drawn off within 3 hours by applying a fine vacuum whereby it was dried at room temperature to a terminal vacuum of 0.3 mbar. In 1000 ml hexane, 21.7 g of the catalyst obtained was reduced to slurry and a sample of the remaining solution was drawn after 1.25 hours of agitation and another 30 minutes of sedimentation time. The tert-butylbenzene content amount to 178 mg/l which corresponds to a tert-butylbenzene content of the catalyst of 8203 ppm (Catalyst M).

Lastly, 2 g of the catalyst dried again to a terminal vacuum of 0.25 mbar was suspended in 86 ml hexane and after agitating overnight, a sample of the hexane solution was drawn. The tert-butylbenzene content amount to 116 mg/l, which corresponds to a content of 4988 ppm in the catalyst (Catalyst M1).

D. POLYMERIZATIONS USING CATALYSTS J TO M

EXAMPLE 30

The procedure took place analogously to Example 10, corresponding to the parameters given in Table 2, but with the difference that Catalyst J was proportioned at 260 rpm and the product was obtained by drying the acetone slurry in the air flow at RT=room temperature (14 hours) and then at 50° C. in the vacuum (4 hours).

A total of 2112 g of powdered ELPP with a Zr content of 32 ppm was obtained (corresponds to 4.57 kg ELPP/g TNZ).

EXAMPLE 31

The procedure took place analogously to Example 10, corresponding to the parameters given in Table 2, but with the difference that Catalyst K was proportioned at 265 rpm and the product was obtained by drying the acetone slurry in the air flow at RT (14 hours) and then at 50° C. in the vacuum (4 hours).

A total of 2010 g of powdered ELPP with a Zr content of 31 ppm was obtained (corresponds to 4.72 kg ELPP/g TNZ).

EXAMPLE 32

The procedure took place analogously to Example 10, corresponding to the parameters given in Table 2, but with the difference that Catalyst J was rinsed at 270 rpm with 1000 g propylene in the reactor and the product was obtained by drying the acetone slurry in the air flow at RT (14 hours) and then at 50° C. in the vacuum (4 hours).

A total of 1461 g of large-grain powdered ELPP with a Zr content of 25 ppm was obtained (corresponds to 5.85 kg ELPP/g TNZ).

EXAMPLE 33

The procedure took place analogously to Example 10, corresponding to the parameters given in Table 2, but with the difference that Catalyst K was proportioned at 260 rpm and the final product was obtained by drying the acetone slurry in the air flow at RT (14 hours) and then at 50° C. in the vacuum (4 hours).

A total of 1982 g of large-grain powdered ELPP with a Zr content of 13 ppm was obtained (corresponds to 11.24 kg ELPP/g TNZ).

EXAMPLE 34

The procedure took place analogously to Example 10, corresponding to the parameters given in Table 2, but with the difference that Catalyst L was proportioned at 270 rpm and the final product was obtained by drying the acetone slurry in the air flow at RT (14 hours) and then at 50° C. in the vacuum (4 hours).

A total of 2730 g of large-grain powdered ELPP with a Zr content of 15 ppm was obtained (corresponds to 9.74 kg ELPP/g TNZ).

EXAMPLE 35

The procedure took place analogously to Example 10, corresponding to the parameters given in Table 2, but with the difference that Catalyst L was proportioned at 260 rpm and the final product was obtained by drying the acetone slurry in the air flow at RT (14 hours) and then at 50° C. in the vacuum (4 hours).

A total of 1353 g of large-grain powdered ELPP with a Zr content of 13 ppm was obtained (corresponds to 10.44 kg ELPP/g TNZ).

EXAMPLE 36

The procedure took place analogously to Example 10, corresponding to the parameters given in Table 2, but with the difference that Catalyst M was proportioned at 260 rpm and the final product was obtained by drying the acetone slurry in the air flow at RT (14 hours) and then at 50° C. in the vacuum (4 hours).

A total of 1925 g of powdered ELPP with a Zr content of 30 ppm was obtained (corresponds to 4.87 kg ELPP/g TNZ).

EXAMPLE 37

The procedure took place analogously to Example 10, corresponding to the parameters given in Table 2, but with the difference that Catalyst M was proportioned at 260 rpm and the final product was obtained by drying the acetone slurry in the air flow at RT (14 hours) and then at 50° C. in the vacuum (4 hours).

A total of 2112 g of partially clumped ELPP with a Zr content of 19 ppm was obtained (corresponds to 7.7 kg ELPP/g TNZ).

TABLE 1

Preparation of the Catalyst

| Ex. | Catalyst | Crude-TNZ* (g) | Hexane (ml) | Filtration (min) | Precipition Temp. (°C.) | Yield TNZ* (%) |
| --- | --- | --- | --- | --- | --- | --- |
| 1 | A | 44.22 | 620 | 140 | −40 | 82.2 |
| 2 | B | 39.95 | 475 | 80 | −40 | 80.2 |
| 3 | C | 28.77 | 380 | 120 | −35 | 84.6 |
| 4 | D | 12.02 | 158 | 50 | −39 | 73.2 |
| 5 | E | 24.2 | 340 | 50 | −40 | 83.8 |
| 6 | F | 31.71 | 380 | 64 | −45 | 83.9 |
| V7 | G | 39.95 | 475 | 80 | −40 | 80.2 |

| Ex. | $Al_2O_3$ conditioned (g) | n-Hexane for $Al_2O_3$ (ml) | TNZ* (g) | n-Hexane for TNZ (ml) | TNZ-introduction stirrer (rpm) | rate (ml/min) | Catalyst dried (g) |
| --- | --- | --- | --- | --- | --- | --- | --- |
| 1 | 266.7 | 5035 | 33.23 | 465 | 350 | 10 | 292 |
| 2 | 232.8 | 4410 | 29.1 | 404 | 350 | 10 | 251.52 |
| 3 | 144.44 | 3000 | 17.35 | 270 | 500 | 10 | 154.62 |
| 4 | 71.04 | 1462 | 8.8 | 136 | 450 | 6 | 76.69 |
| 5 | 148.25 | 2800 | 18.46 | 260 | 450 | 10 | 162.31 |
| 6 | 203.3 | 3850 | 25.27 | 356 | 400 | 10 | 215.75 |
| V7 | 4 | 76 | 0.5 | 10 | 350 | 0.5 | |

*tetraneophylzirconium

TABLE 2

Polymerization

| Ex. | Catalyst (g) | Propene (kg) | Polym. temp. (°C.) | Polym. time (hours) | Acetone (AC) or methanol (Me) addition (kg) | Flashing (°C.) | (°C.) |
| --- | --- | --- | --- | --- | --- | --- | --- |
| 10 | 11.24 A | 7.3 | 60 | 1.1 | 4 Ac | 40–50 | 60–50 |
| 11 | 6.17 F | 6.6 | 60 | 1 | 2.5 Ac | 40 | 40–35 |
| 12 | 10.02 A | 7.6 | 60 | 2 | 1.88 Ac | 50 | 60–46 |

TABLE 2-continued

| Ex. | | | | | | | |
|---|---|---|---|---|---|---|---|
| 13 | 10.82 D | 7.6 | 60 | 2 | 1.7 Me | 40–50 | 60–46 |
| 14 | 11.26 A | 7.6 | 60 | 4 | 2.5 Ac | 40–50 | 56–32 |
| 15 | 8.55 A | 7.6 | 60 | 6 | 2.5 Ac | 40–50 | 55–32 |
| 16 | 11.46 F | 7.6 | 70 | 1 | 2.5 Ac | 40–50 | 67–36 |
| 17 | 6.02 A | 7.6 | 70 | 2 | 2.8 Ac | 50 | 65–22 |
| 18 | 4.4 B | 7 | 70 | 4 | 2.5 Ac | 40–50 | 56–25 |
| V19 | 4.5 G | 7 | 70 | 4 | 2.5 Ac | 40–50 | 56–25 |
| 20 | 5.4 E | 6.5 | 80 | 2 | 2.5 Ac | 50 | 69–40 |
| 21 | 4.26 F | 7.4 | 80 | 4 | 2.5 Ac | 40–50 | 70–40 |
| 22 | 11.12 C | 7.6 (plus ethene) | 60 | 1 | 2.5 Ac | 25 | 50–25 |
| 23 | 7.26 A | 7.6 (plus ethene) | 60 | 2 | 2.5 Ac | 40–50 | 55–35 |
| 24 | 8.25 H | 7.2 | 60 | 2.1 | 2.7 Ac | 25 | 53–13 |
| 25 | 5.42 I | 7.1 | 70 | 4 | 3 Ac | 50 | 53–25 |
| 30 | 4.00 J | 7.2 | 70 | 4 | 2.5 Ac | 25 | 70–30 |
| 31 | 4.30 K | 7.2 | 70 | 4 | 2.5 Ac | 25 | 70–30 |
| 32 | 2.68 J | 6.4 | 70 | 8 | 2.5 Ac | 25 | 70–30 |
| 33 | 2.91 K | 7.2 | 70 | 8 | 2.3 Ac | 25 | 70–30 |
| 34 | 2.89 L | 6.9 | 70 | 7.58 | 3.0 Ac | 25 | 70–30 |
| 35 | 2.04 L | 6.8 | 80 | 4.01 | 2.5 Ac | 25 | 80–30 |
| 36 | 3.41 M | 7.0 | 70 | 4 | 2.2 Ac | 25 | 70–30 |
| 37 | 2.91 M | 7.0 | 80 | 4 | 3.0 Ac | 25 | 80–30 |

| Ex. | Polymer (kg) | Zr (ppm) | $Al_2O_3$ (%) | Tm (°C.) | Intrinsic viscosity (dl/g) |
|---|---|---|---|---|---|
| 10 | 1.39 | 135 | 0.74 | 147.1 | |
| 11 | 1.07 | 99 | 0.54 | 149.1 | 5.42 |
| 12 | 1.88 | 89 | 0.49 | 148.1 | |
| 13 | 1.93 | 94 | 0.52 | 147 | 10.1 |
| 14 | 2.72 | 69 | 0.38 | 147.2 | |
| 15 | 2.46 | 58 | 0.32 | 147.9 | |
| 16 | 1.76 | 111 | 0.61 | | |
| 17 | 1.45 | 69 | 0.38 | | 10.35 |
| 18 | 1.82 | 41 | 0.22 | | 9.6 |
| V19 | 1.22 | 60 | 0.33 | | |
| 20 | 1.67 | 54 | 0.30 | 147.2 | |
| 21 | 2.11 | 35 | 0.19 | | |
| 22 | 3.13 | 58 | 0.33 | | |
| 23 | 2.91 | 42 | 0.23 | | |
| 24 | 1.59 | 89 | 0.49 | | |
| 25 | 1.89 | 50 | 0.27 | | |
| 30 | 2.11 | 32 | | 150.5 | 11.6 |
| 31 | 2.01 | 31 | | | |
| 32 | 1.46 | 25 | | 147.3 | 13.1 |
| 33 | 1.98 | 13 | | | |
| 34 | 2.73 | 15 | | 148 | 11.1 |
| 35 | 1.35 | 14 | | | |
| 36 | 1.93 | 30 | | | |
| 37 | 2.11 | 19 | | | |

What we claim is:

1. Highly active catalyst comprising the reaction product of:
   a) tetraneophylzirconium with
   b) metal oxides selected from the group consisting of IIa, IIIa, IVa and IVb metal oxides having a partly hydroxylated surface, or mixtures thereof,
   in a hydrocarbon as the reaction medium, the resulting catalyst optionally being hydrogenated, wherein the resulting catalyst contains the by-products formed during the reaction in an amount not exceeding 1.1% by weight, said by-products comprising tert-butylbenzene.

2. Catalyst according to claim 1, which contains the by-products formed during the reaction in an amount not exceeding 0.3% by weight.

3. Catalyst according to claim 1, wherein the metal oxides are selected from the group consisting of $Al_2O_3$, $TiO_2$, $SiO_2$ and MgO.

4. Catalyst according to claim 1, which comprises the reaction product of tetraneophylzirconium and hydroxylated $Al_2O_3$.

5. Catalyst according to claim 1, which is suitable for homo- or copolymerization of ethylene, propylene, 1-butene, 1-pentene or 4-methyl-1-pentene.

* * * * *